(12) United States Patent
Tang

(10) Patent No.: US 12,113,689 B2
(45) Date of Patent: *Oct. 8, 2024

(54) METHOD AND DEVICE FOR DATA TRANSMISSION

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/393,244

(22) Filed: Aug. 3, 2021

(65) Prior Publication Data

US 2021/0385142 A1    Dec. 9, 2021

Related U.S. Application Data

(63) Continuation of application No. 16/091,168, filed as application No. PCT/CN2016/086210 on Jun. 17, 2016, now Pat. No. 11,102,098.

(51) Int. Cl.
*H04L 12/26* (2006.01)
*H04L 1/08* (2006.01)
(Continued)

(52) U.S. Cl.
CPC ............ *H04L 43/0823* (2013.01); *H04L 1/08* (2013.01); *H04L 1/1864* (2013.01); *H04L 1/189* (2013.01); *H04L 5/0055* (2013.01); *H04W 28/04* (2013.01)

(58) Field of Classification Search
CPC ..... H04L 43/0823; H04L 1/08; H04L 1/1864; H04L 1/189; H04L 5/0055; H04L 1/1812;
(Continued)

(56) References Cited

U.S. PATENT DOCUMENTS 7,321,580 B1 * 1/2008 Ramanathan ..... H04W 74/0816
370/339
9,194,936 B1  11/2015 Keegan
(Continued)

FOREIGN PATENT DOCUMENTS

CN    101388756 A    3/2009
CN    101405980 A *  4/2009 ............... H04L 1/16
(Continued)

OTHER PUBLICATIONS

R1-165083 URLLC in NR frame structure; May 2016.*
(Continued)

*Primary Examiner* — Jay P Patel
(74) *Attorney, Agent, or Firm* — Ladas & Parry, LLP

(57) ABSTRACT

Disclosed are a method and device for data transmission. The method comprises: before a transmitting end receives feedback information, the transmitting end continually transmits multiple packets carrying same information to the receiving end, the feedback information carrying indication information used for indicating whether the receiving end correctly receives at least some packets of the multiple packets; the transmitting end receives the feedback information transmitted by the receiving end; and the transmitting end transmits subsequent data on the basis of the feedback information. In the solution, the transmitting end can continually transmit multiple packets carrying same information to the receiving end until the transmitting end receives the feedback information transmitted by the receiving end, and the transmitting end then determines subsequent data transmission on the basis of the feedback information. In such data transmission mechanism, because a transmitting end continually transmits packets carrying same information to a receiving end, the reliability of data transmission is increased.

15 Claims, 4 Drawing Sheets

(51) Int. Cl.
  *H04L 1/1829* (2023.01)
  *H04L 1/1867* (2023.01)
  *H04L 5/00* (2006.01)
  *H04L 43/0823* (2022.01)
  *H04W 28/04* (2009.01)

(58) Field of Classification Search
  CPC ............. H04W 28/04; H04W 28/0236; H04W 28/0268; H04W 28/06; H04W 72/1257
  See application file for complete search history.

(56) References Cited

U.S. PATENT DOCUMENTS

| | | | |
|---|---|---|---|
| 9,265,054 B2 * | 2/2016 | Miyauchi | G06F 12/00 |
| 9,742,604 B2 | 8/2017 | Kim et al. | |
| 9,787,438 B2 * | 10/2017 | Chae | H04W 72/0446 |
| 10,187,878 B2 | 1/2019 | Lin et al. | |
| 10,517,082 B2 | 12/2019 | Baligh | |
| 2004/0148552 A1 | 7/2004 | Matsumoto | |
| 2005/0152314 A1 | 7/2005 | Sun | |
| 2006/0245512 A1 | 11/2006 | Rha | |
| 2007/0025486 A1 * | 2/2007 | Gainey | H04B 7/15535 |
| | | | 375/356 |
| 2007/0070902 A1 | 3/2007 | Elaoud | |
| 2008/0299984 A1 | 12/2008 | Shimomura | |
| 2009/0209264 A1 | 8/2009 | Yang | |
| 2009/0259911 A1 * | 10/2009 | Tseng | H04L 1/1812 |
| | | | 714/E11.131 |
| 2010/0070817 A1 | 3/2010 | Heise | |
| 2010/0098006 A1 | 4/2010 | Golitschek Edler Von Elbwart | |
| 2010/0098010 A1 * | 4/2010 | Kuo | H04W 72/1242 |
| | | | 370/329 |
| 2010/0098042 A1 | 4/2010 | Dent | |
| 2010/0128660 A1 | 5/2010 | Becker | |
| 2010/0275085 A1 * | 10/2010 | Venkatachalam | H04W 72/04 |
| | | | 714/E11.131 |
| 2011/0038430 A1 | 2/2011 | Yoshimoto | |
| 2011/0051599 A1 | 3/2011 | Tanigawa | |
| 2012/0069768 A1 * | 3/2012 | Ghassemzadeh | H04L 1/0643 |
| | | | 370/252 |
| 2012/0182878 A1 | 7/2012 | Qian | |
| 2012/0243486 A1 | 9/2012 | Zeira | |
| 2012/0243487 A1 | 9/2012 | Wang | |
| 2012/0263299 A1 | 10/2012 | Akhavan-Toyserkani | |
| 2013/0010833 A1 | 1/2013 | Ogawa | |
| 2013/0136042 A1 | 5/2013 | Chan | |
| 2013/0195002 A1 | 8/2013 | Walker et al. | |
| 2013/0329573 A1 | 12/2013 | Chen | |
| 2014/0053049 A1 | 2/2014 | Chen | |
| 2014/0119295 A1 | 5/2014 | Kanamarlapudi et al. | |
| 2014/0133327 A1 * | 5/2014 | Miyauchi | H04W 52/241 |
| | | | 370/252 |
| 2014/0177464 A1 | 6/2014 | Kanamarlapudi et al. | |
| 2015/0071209 A1 * | 3/2015 | Chae | H04L 1/1614 |
| | | | 370/329 |
| 2015/0208442 A1 | 7/2015 | Bai | |
| 2015/0304838 A1 | 10/2015 | Kanamarlapudi et al. | |
| 2016/0050686 A1 | 2/2016 | Krishnamoorthi et al. | |
| 2016/0066296 A1 | 3/2016 | Su et al. | |
| 2016/0112908 A1 | 4/2016 | Chin et al. | |
| 2016/0117463 A1 | 4/2016 | Nemiroski et al. | |
| 2016/0119105 A1 | 4/2016 | Jiang et al. | |
| 2016/0183250 A1 | 6/2016 | Fang et al. | |
| 2016/0219641 A1 * | 7/2016 | Chae | H04W 72/0446 |
| 2016/0262185 A1 | 9/2016 | Ghosh et al. | |
| 2016/0380751 A1 | 12/2016 | Lindoff et al. | |
| 2017/0026947 A1 | 1/2017 | Kim et al. | |
| 2017/0104568 A1 | 4/2017 | Nasiri Khormuji | |
| 2017/0142605 A1 | 5/2017 | Cheng et al. | |
| 2017/0201892 A1 | 7/2017 | Wen et al. | |
| 2017/0230213 A1 | 8/2017 | Wang et al. | |
| 2017/0289984 A1 | 10/2017 | Baligh | |
| 2017/0331670 A1 | 11/2017 | Parkvall et al. | |
| 2018/0007709 A1 * | 1/2018 | Seo | H04W 72/0406 |
| 2018/0020441 A1 | 1/2018 | Lo | |
| 2018/0034608 A1 * | 2/2018 | Seo | H04L 5/0048 |
| 2018/0332500 A1 | 11/2018 | Wiberg et al. | |
| 2018/0359061 A1 * | 12/2018 | Wang | H04L 1/00 |
| 2019/0013914 A1 | 1/2019 | Xu et al. | |
| 2019/0036655 A1 * | 1/2019 | Cao | H04L 1/1812 |

FOREIGN PATENT DOCUMENTS

| | | | | |
|---|---|---|---|---|
| CN | 101765147 A | 6/2010 | | |
| CN | 102027702 A | 4/2011 | | |
| CN | 102098145 A | 6/2011 | | |
| CN | 102489033 A | 5/2012 | | |
| CN | 103248484 A | 8/2013 | | |
| CN | 103378932 A | 10/2013 | | |
| CN | 104184551 A * | 12/2014 | | |
| CN | 104244191 A | 12/2014 | | |
| CN | 104348573 A | 2/2015 | | |
| CN | 105191459 A | 12/2015 | | |
| CN | 106233657 A * | 12/2016 | ........... | H04L 5/0007 |
| CN | 105264809 B * | 1/2020 | ........... | H04L 1/1607 |
| EP | 2154808 A1 * | 2/2010 | ........... | H04L 1/1887 |
| EP | 2640117 A1 * | 9/2013 | ............. | G06F 12/00 |
| EP | 2557724 B1 * | 10/2013 | ........... | H04L 1/0003 |
| EP | 3113559 A1 * | 1/2017 | ........... | H04L 1/1822 |
| EP | 3125458 A1 * | 2/2017 | ............... | H04L 1/00 |
| JP | S62239735 A | 10/1987 | | |
| JP | 2015527791 A | 9/2015 | | |
| WO | WO-2006133269 A2 * | 12/2006 | ......... | H04B 7/15528 |
| WO | WO-2007074452 A2 * | 7/2007 | ........... | H04B 7/2681 |
| WO | 2009033413 A1 | 3/2009 | | |
| WO | WO-2012063368 A1 * | 5/2012 | ............. | G06F 12/00 |
| WO | WO-2012127591 A1 * | 9/2012 | ........... | H04L 1/1887 |
| WO | 2015139319 A1 | 9/2015 | | |
| WO | 2015145592 A1 | 10/2015 | | |
| WO | h04 1 * | 10/2015 | ............... | H04L 1/00 |
| WO | 2016069159 A1 | 5/2016 | | |

OTHER PUBLICATIONS

Notice of Allowance of the Chinese application No. 202010470489.4, issued on Nov. 2, 2021.
Supplementary European Search Report in the European application No. 21189751.7, mailed on Nov. 3, 2021.
First Office Action of the Taiwanese application No. 106118609, issued on Apr. 28, 2022 with English translation provided by applicant's foreign counsel.
First Office Action and search report of the Chinese application No. 202010469195.X, issued on May 31, 2022 with English translation by Global Dossier.
International Search Report in the international application No. PCT/CN2016/086210, mailed on Feb. 27, 2017.
Written Opinion of the International Search Authority in international application No. PCT/CN2016/086210, mailed on Feb. 27, 2017.
Zte et al.: "Consideration on URLLC in NR frame structure", 3GPP Draft; R1-165083 URLLC in NR Frame Structure. 3rd Generation Partnership Project (3GPP), Mobile Competence Centre 650, Route Des Lucioles: F-06921 Sophia-Antipolis Cedex France vol. RAN WG1, no. Nanjing, China; May 23, 2016 May 27, 2016 May 14, 2016 (May 14, 2018), XP051089856, entire document.
Nokia et al: "On Hybrid ARQ functionality for NR" 3GPP Draft; R2-163444 HARQ, 3rd Generation Partnership Project (3GPP), Mobile Competence Centre ; 650, Route Des Lucioles; F-06921 Sophia-Antipolis Cedex ; FRANCE, vol. RAN WG2, no. Nanjing, China; May 23, 2015-May 27, 2016 May 22, 2016 (May 22, 2016), XP051104947, entire document.
Partial Supplementary European Search Report in the European application No. 16905091.1, mailed on Mar. 19, 2019.
First Office Action of the Chinese application No. 201680084428.7, issued on Aug. 5, 2019.
LG Eletroni cs:" Discussion on PUSCH transmissions for MTC", 3GPP Draft: R1-152703 MTC PUSCH, 3rd Generation Partnership Project(3GPP), Mobile Competence Centre; 650, Route Des Lucioles: F-06921 Sophia-Antipolis Cedex, France, vol. RAN WG1, No.

(56) References Cited

OTHER PUBLICATIONS

Fukuoka, Japan; May 25, 2015-May 25, 2015 May 16, 2015(May 16, 2015), XP050972163, entire document.
SONY:"Lower Complexity Antenna for MTC Devices", 3GPP Draft; R1-153084 3rd Generation Partnership Project (3GPP), Mobile Competence Centre; 650, Route Des Lucioles; F-06921 Sophia-Antipolis Cedex; France, vol. RAN WG1, no. Fukuoka, Japan; May 25, 2015-May 29, 2015 May 16, 2015 (May 16, 2016), XP050972555, entire document.
Supplementary European Search Report in the European application No. 16905091.1, mailed on Nov. 29, 2019.
Written Opinion of the Singaporean application No. 11201902352T, issued on Mar. 6, 2020.
Notice of Allowance of the Chinese application No. 201680084426.7, issued on Mar. 17, 2020.
First Ofice Action of the Indian application No. 201817047409, issued on Jul. 22, 2020.
First Office Action of the Canadian application No. 3043347, issued on Jun. 10, 2020.
"Way Forward on Ack/Nack feedback of DL HARQ for NR" 3GPP TSG RAN WG1 #85 R1-166032, Nanjing, China, May 23-27, 2016, entire document.
"3GPP TS 36.213 V13.0.1-release 13" (Jan. 2016), entire document.
First Office Action of the Japanese application No. 2018-554748, issued on Aug. 21, 2020.
First Office Action of the European application No. 16905091.1. issued on Sep. 25, 2020.
Second Written Opinion of the Singaporean application No. 11201902352T, issued on Mar. 3, 2021.
Second Office Action of the Canadian application No. 3043347, issued on Mar. 18, 2021.
First Office Action of the Chinese application No. 202010470489.4, issued on Jul. 22, 2021.
First Office Action of the U.S. Appl. No. 16/091,168, issued on Jan. 3, 2020.
Second Office Action of the U.S. Appl. No. 16/091,188, issued on Jul. 7, 2020.
Final Office Action of the U.S. Appl. No. 16/091,166, issued on Dec. 28, 2020.
Notice of Allowance of the U.S. Appl. No. 16/091,168, issued on Apr. 26, 2021.
Second Office Action of the Japanese application No. 2018-554748, issued on May 7, 2021.
Second Office Action of the Chinese application No. 202010469195.X, issued on Aug. 18, 2022 with machine translation by Global Dossier.
Notice of Rejection of the Taiwanese application No. 106118609, issued on Sep. 8, 2022 with machine translation by Global Dossier.
Hearing Notice of the corresponding Indian application No. 201817047409, issued on Nov. 28, 2023 with English translation.

* cited by examiner

METHOD AND DEVICE FOR DATA TRANSMISSION

CROSS-REFERENCE TO RELATED APPLICATIONS

This application is a continuation of U.S. application Ser. No. 16/091,168, filed on Oct. 4, 2018, which is the U.S. national phase of International Application No. PCT/CN2016/086210, filed on Jun. 17, 2016, the disclosures of which are hereby incorporated by reference in their entireties.

TECHNICAL FIELD

The disclosure relates to the field of communications, and more particularly to a method and device for data transmission.

BACKGROUND

In a 5 Generation (5G) mobile communication technology, there are higher requirements on the transmission latency, reliability of data packets and the like. Particularly, for an Ultra-Reliable Low-latency Communication (URLLC) service, a relatively short transmission latency and relatively high transmission reliability are required. In an existing data transmission mechanism of Long Term Evolution (LTE), a transmitter, after transmitting a data packet, is required to wait for feedback information transmitted by a receiver and then determine whether it is necessary to perform Hybrid Automatic Repeat reQuest (HARQ) retransmission on the data packet according to the feedback information. Since the receiver requires a certain time for data detection over the data packet and transmission of the feedback information, such a "transmitting-waiting-transmitting" data transmission mechanism may result in relatively long transmission latency. Meanwhile, when the transmitter transmits the data packet only once, a probability that the feedback information transmitted by the receiver contains Negative ACKnowledgment (HACK) information is usually higher, and thus it is also difficult to ensure data transmission reliability with the above data transmission mechanism.

SUMMARY

The disclosure discloses a method and device for data transmission, so as to improve the reliability of the data transmission.

According to a first aspect, the disclosure provides a method for data transmission, which may include the following operations. Before a transmitter receives feedback information, the transmitter continuously transmits multiple data packets carrying same information to a receiver, wherein the feedback information carries indication information for indicating whether the receiver correctly receives at least part of the multiple data packets. The transmitter receives the feedback information transmitted by the receiver. The transmitter transmits subsequent data according to the feedback information.

In the solution, the transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In combination with the first aspect, in a possible implementation mode of the first aspect, the operation that the transmitter continuously transmits the multiple data packets carrying the same information to the receiver may include that: the transmitter continuously transmits the multiple data packets to the receiver based on a transmission pattern corresponding to each of the multiple data packets.

In the solution, each of the multiple data packets carrying the same information may correspond to a transmission pattern, so that the transmitter may transmit the multiple data packets in a more flexible manner.

In combination with the first aspect or any abovementioned possible implementation mode, in a possible implementation mode of the first aspect, the operation that the transmitter continuously transmits the multiple data packets carrying the same information to the receiver may include that: the transmitter transmits the multiple data packets to the receiver based on at least two transmission patterns.

In the solution, the transmitter may transmit the multiple data packets carrying the same information to the receiver based on different transmission patterns. Since diversified transmission patterns may improve diversity of data packet transmission manners, a probability that the receiver correctly receives the data packets may be improved.

In combination with the first aspect or any abovementioned possible implementation mode, in a possible implementation mode of the first aspect, the feedback information may carry transmission information of a target data packet in the multiple data packets, and the operation that the transmitter transmits the subsequent data according to the feedback information may include the following actions. The transmitter determines a transmission pattern corresponding to the target data packet according to the transmission information of the target data packet. The transmitter determines a transmission pattern for transmission of the subsequent data according to the transmission pattern corresponding to the target data packet. The transmitter transmits the subsequent data with the transmission pattern for transmission of the subsequent data.

In the solution, the receiver carries the transmission information of the target data packet into the feedback information, such that the transmitter may adjust the transmission pattern used for subsequent data transmission according to the transmission information of the target data packet.

In combination with the first aspect or any abovementioned possible implementation mode, in a possible implementation mode of the first aspect, the feedback information may carry at least one of the transmission pattern corresponding to the target data packet in the multiple data packets or a transmission sequence number of the target data packet.

In the solution, the receiver carries the transmission sequence number, corresponding to the target data packet, of the target data packet into the feedback information to enable the transmitter to determine whether the receiver correctly receives the target data packet. The receiver carries at least one of the transmission pattern corresponding to the target data packet or the transmission sequence number of the target data packet in the feedback information, such that the transmitter may adjust regulate the transmission pattern used for subsequent data transmission according to at least one of the transmission pattern corresponding to the target data packet or the transmission sequence number of the target data packet.

In combination with the first aspect or any abovementioned possible implementation mode, in a possible implementation mode of the first aspect, the target data packet may include one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In the solution, the receiver carries at least one of the transmission pattern corresponding to the target data packet or the transmission sequence number of the target data packet in the feedback information, such that the transmitter may adjust the transmission pattern used for subsequent data transmission according to at least one of the transmission pattern corresponding to the target data packet or the transmission sequence number of the target data packet.

In combination with the first aspect or any abovementioned possible implementation mode, in a possible implementation mode of the first aspect, the transmission pattern may be formed by at least one of the following transmission information: HARQ redundancy version information, frequency-domain resource information, time-domain resource information, beamforming vector information, subcarrier spacing information, duration information of the data transmission, pilot sequence information or scrambling sequence information.

In the solution, the transmission pattern may include at least one of transmission information, so that the data transmission mechanism may be more diversified.

In combination with the first aspect or any abovementioned possible implementation mode, in a possible implementation mode of the first aspect, the transmission pattern corresponding to each of the multiple data packets may be predetermined by the transmitter and the receiver; or the transmission pattern corresponding to each of the multiple data packets may be indicated to the receiver by the transmitter through signaling.

In the solution, the transmitter and the receiver may predetermine the transmission patterns or obtain the transmission patterns through signaling interaction, so that the transmitter and the receiver may acquire the transmission patterns in a more flexible manner.

In combination with the first aspect or any abovementioned possible implementation mode, in a possible implementation mode of the first aspect, the feedback information may carry indication information for indicating whether the receiver correctly receives a specified data packet in the multiple data packets transmitted by the transmitter, and the specified data packet has a preset timing relationship with the feedback information.

In the solution, the feedback information is configured to indicate whether the data packet having the preset timing relationship with the feedback information is correctly received by the receiver, so that the data transmission mechanism in the solution is more flexible.

In combination with the first aspect or any abovementioned possible implementation mode, in a possible implementation mode of the first aspect, the preset timing relationship may be a timing relationship predetermined by the transmitter and the receiver, or the preset timing relationship may be indicated to the receiver by the transmitter through signaling.

In the solution, the transmitter and the receiver may determine the preset timing relationship in a predetermination manner or obtain the preset timing relationship through the signaling interaction, so that the transmitter and the receiver may acquire the preset timing relationship in a more flexible manner.

In combination with the first aspect or any abovementioned possible implementation mode, in a possible implementation mode of the first aspect, the feedback information may carry any one of the following indication information: indication information for indicating whether the receiver correctly receives the first data packet in the multiple data packets, the first data packet being any data packet in the multiple data packets; indication information for indicating whether the receiver correctly receives at least two data packets in the multiple data packets; or indication information for indicating whether the receiver correctly receives the information contained carried in the multiple data packets.

In the solution, the receiver may transmit different types of feedback information to the transmitter to improve flexibility of the data transmission mechanism.

In combination with the first aspect or any abovementioned possible implementation mode, in a possible implementation mode of the first aspect, the operation that the transmitter transmits the subsequent data according to the feedback information may include the following operations. Responsive to determining that the feedback information is ACKnowledgment (ACK) information, the transmitter stops transmitting a data packet carrying the same information as that of the multiple data packets. Responsive to determining that the feedback information is NACK information, the transmitter transmits the data packet carrying the same information as that of the multiple data packets.

In the solution, the receiver may transmit the feedback information to the transmitter, such that the transmitter may timely adjust subsequent data transmission according to the feedback information.

In combination with the first aspect or any abovementioned possible implementation mode, in a possible implementation mode of the first aspect, when the feedback information is the NACK information, the operation that the transmitter retransmits the data packet carrying the information the same as that of the multiple data packets may include the following action. When the number of transmissions of the multiple data packets by the transmitter exceed a preset number of transmissions, the transmitter stops transmitting the data packet carrying the information the same as that of the multiple data packets.

In the solution, when a number of transmissions of the multiple data packets by the transmitter exceed a preset number of transmissions, the transmitter stops transmitting the data packet carrying the information the same as that of the multiple data packets, so that a data transmission overhead is saved.

In combination with the first aspect or any abovementioned possible implementation mode, in a possible implementation mode of the first aspect, before the operation that the transmitter continuously transmits the multiple data packets carrying the same information to the receiver, the method may further include the following operations. The transmitter transmits a scheduling signaling to the receiver, wherein the scheduling signaling is configured to indicate the receiver to receive the multiple data packets, or the transmitter transmits multiple scheduling signalings to the receiver, wherein the multiple scheduling signalings are in one-to-one correspondence with the multiple data packets and each scheduling signaling is configured to indicate the receiver to receive the data packet corresponding to the scheduling signaling.

In the solution, diversified scheduling manners are adopted for the receiver, so that the flexibility of the data transmission mechanism is improved.

In combination with the first aspect or any abovementioned possible implementation mode, in a possible implementation mode of the first aspect, when the transmitter is a base station, before the operation that the transmitter continuously transmits the multiple data packets carrying the same information to the receiver, the method further includes the following operations. The transmitter transmits Downlink Control Information (DCI) to the receiver, wherein the DCI is configured to indicate the receiver to receive the multiple data packets, or the transmitter transmits multiple DCI to the receiver, wherein the DCI is in one-to-one correspondence with the multiple data packets and the DCI is configured to indicate the receiver to receive the data packet corresponding to each scheduling signaling.

In the solution, diversified scheduling manners are adopted for the receiver, so that the flexibility of the data transmission mechanism is improved.

According to a second aspect, the disclosure provides a method for data transmission, which may include the following operations. A receiver receives multiple data packets continuously transmitted by a transmitter and carrying the same information, wherein feedback information carries indication information for indicating whether the receiver correctly receives at least part of the multiple data packets. The receiver detects the at least part of data packets in the multiple data packets to determine a detection result of the at least part of data packets. The receiver determines the feedback information for the at least part of the multiple data packets according to the detection result of the at least part of the multiple data packets, wherein feedback information carries the indication information for indicating whether the receiver correctly receives the at least part of the multiple data packets. The receiver transmits the feedback information to the transmitter.

In the solution, the transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In combination with the second aspect, in a possible implementation mode of the second aspect, the operation that the receiver receives the multiple data packets continuously transmitted by the transmitter and carrying the same information may include the following action. The receiver receives the multiple data packets continuously transmitted by the transmitter and carrying the same information based on a transmission pattern corresponding to each of the multiple data packets.

In the solution, each of the multiple data packets carrying the same information may correspond to a transmission pattern, so that the transmitter may transmit the multiple data packets in a more flexible manner.

In combination with the second aspect or any abovementioned possible implementation mode, in a possible implementation mode of the second aspect, the operation that the receiver receives the multiple data packets continuously transmitted by the transmitter and carrying the same information may include the following action. The receiver receives the multiple data packets transmitted by the transmitter and carrying the same information based on at least two transmission patterns.

In the solution, the transmitter may transmit the multiple data packets carrying the same information to the receiver based on different transmission patterns. Since diversified transmission patterns may improve diversity of data packet transmission manners, a probability that the receiver correctly receives the data packets is improved.

In combination with the second aspect or any abovementioned possible implementation mode, in a possible implementation mode of the second aspect, the operation that the receiver transmits the feedback information to the transmitter may include the following action. The receiver transmits the feedback information to the transmitter, wherein the feedback information carries information for indicating at least one of a transmission pattern corresponding to a target data packet in the multiple data packets or a transmission sequence number of the target data packet.

In the solution, the receiver carries the transmission sequence number, corresponding to the target data packet, of the target data packet into the feedback information to enable the transmitter to determine whether the receiver correctly receives the target data packet. The receiver contains at least one of the transmission pattern corresponding to the target data packet or the transmission sequence number of the target data packet in the feedback information, such that the transmitter may adjust a transmission pattern used for subsequent data transmission according to at least one of the transmission pattern corresponding to the target data packet or the transmission sequence number of the target data packet.

In combination with the second aspect or any abovementioned possible implementation mode, in a possible implementation mode of the second aspect, the target data packet may include any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In the solution, the receiver carries at least one of the transmission pattern corresponding to the target data packet or the transmission sequence number of the target data packet in the feedback information, such that the transmitter may adjust the transmission pattern used for subsequent data transmission according to at least one of the transmission pattern corresponding to the target data packet or the transmission sequence number of the target data packet.

In combination with the second aspect or any abovementioned possible implementation mode, in a possible implementation mode of the second aspect, the transmission pattern corresponding to each of the multiple data packets may be predetermined by the transmitter and the receiver, or the transmission pattern corresponding to each of the multiple data packets may be indicated to the receiver by the transmitter through signaling.

In combination with the second aspect or any abovementioned possible implementation mode, in a possible implementation mode of the second aspect, the transmission pattern may be formed by at least one of the following transmission information: HARQ redundancy version information, frequency-domain resource information, time-domain resource information, beamforming vector information, subcarrier spacing information, duration information of the data transmission, pilot sequence information or scrambling sequence information.

In the solution, the transmission pattern may include at least one of transmission information, so that the data transmission mechanism may be more diversified.

In combination with the second aspect or any abovementioned possible implementation mode, in a possible implementation mode of the second aspect, the transmission pattern corresponding to each of the multiple data packets may be predetermined by the transmitter and the receiver; or the transmission pattern corresponding to each data packet in the multiple data packets may be transmitted to the receiver by the transmitter through the signaling.

In the solution, the transmitter and the receiver may predetermine the transmission patterns or obtain the transmission patterns through signaling interaction, so that the transmitter and the receiver may acquire the transmission patterns in a more flexible manner.

In combination with the second aspect or any abovementioned possible implementation mode, in a possible implementation mode of the second aspect, the operation that the receiver transmits the feedback information to the transmitter may include the following action. The receiver transmits the feedback information to the transmitter, wherein the feedback information carries indication information for indicating whether the receiver correctly receives a specified data packet in the multiple data packets transmitted by the transmitter and the specified data packet has a preset timing relationship with the feedback information.

In the solution, the feedback information is configured to indicate whether the data packet having the preset timing relationship with the feedback information is correctly received by the receiver, so that the data transmission mechanism in the solution is more flexible.

In combination with the second aspect or any abovementioned possible implementation mode, in a possible implementation mode of the second aspect, the preset timing relationship may be a timing relationship predetermined by the transmitter and the receiver, or the preset timing relationship may be indicated to the receiver by the transmitter through signaling.

In the solution, the transmitter and the receiver may determine the preset timing relationship in a predetermination manner or obtain the preset timing relationship through the signaling interaction, so that the transmitter and the receiver may acquire the preset timing relationship in a more flexible manner.

In combination with the second aspect or any abovementioned possible implementation mode, in a possible implementation mode of the second aspect, the feedback information may carry any one of the following indication information: indication information for indicating whether the receiver correctly receives a first data packet in the multiple data packets, the first data packet being any data packet in the multiple data packets; indication information for indicating whether the receiver correctly receives at least two data packets in the multiple data packets; or indication information for indicating whether the receiver correctly receives the information carried in the multiple data packets.

In the solution, the receiver may transmit different types of feedback information to the transmitter to improve flexibility of the data transmission mechanism.

In combination with the second aspect or any abovementioned possible implementation mode, in a possible implementation mode of the second aspect, the operation that the receiver transmits the feedback information to the transmitter may include the following action. The receiver transmits the feedback information carrying ACK information to the transmitter, or the receiver transmits the feedback information carrying NACK information to the transmitter.

In combination with the second aspect or any abovementioned possible implementation mode, in a possible implementation mode of the second aspect, before the operation that the receiver receives the multiple data packets continuously transmitted by the transmitter and carrying the same information, the method may further include the following operations. The receiver receives a scheduling signaling transmitted by the transmitter, wherein the scheduling signaling is configured to indicate the receiver to receive the multiple data packets transmitted by the transmitter. Alternatively, the receiver receives multiple scheduling signalings, wherein the multiple scheduling signalings are in one-to-one correspondence with the multiple data packets and each scheduling signaling is configured to indicate the receiver to receive the data packet corresponding to the scheduling signaling.

In the solution, diversified scheduling manners are adopted for the receiver, so that the flexibility of the data transmission mechanism is improved.

In combination with the second aspect or any abovementioned possible implementation mode, in possible implementation mode of the second aspect, the operation that the receiver detects the at least part of data packets in the multiple data packets may include the following action. The receiver detects each data packet in the multiple data packets, or the receiver performs joint detection on at least two data packets in the multiple data packets.

In the solution, the receiver may independently detect the multiple data packets transmitted by the transmitter or perform joint detection on the at least part of data packets in the multiple data packets, so that the receiver may detect the data packets in diversified manners to improve the flexibility of the data packet detection.

In combination with the second aspect or any abovementioned possible implementation mode, in a possible implementation mode of the second aspect, before the operation that the receiver receives the multiple data packets continuously transmitted by the transmitter and carrying the same information, the method further includes the following action. The receiver receives DCI, wherein the DCI is configured to indicate the receiver to receive the multiple data packets transmitted by the transmitter, or the receiver receives multiple DCI, wherein the multiple DCI is in one-to-one correspondence with the multiple data packets and each DCI is configured to indicate the receiver to receive the data packet corresponding to the DCI.

In the solution, diversified scheduling manners are adopted for the receiver, so that the flexibility of the data transmission mechanism is improved.

In combination with the second aspect or any abovementioned possible implementation mode, in a possible implementation mode of the second aspect, the feedback information is configured to indicate whether the receiver correctly receives any one of the multiple data packets, or the feedback information is configured to indicate whether the receiver correctly receives at least two data packets in the multiple data packets.

In the solution, the receiver may transmit different types of feedback information to the transmitter to improve the flexibility of the data transmission mechanism.

In combination with the second aspect or any abovementioned possible implementation mode, in a possible implementation mode of the second aspect, the feedback information is configured to indicate whether the receiver correctly receives the information in the multiple data packets.

In the solution, the receiver may transmit the feedback information to the transmitter, such that the transmitter may timely adjust the subsequent data transmission condition according to the feedback information.

In combination with the second aspect or any abovementioned possible implementation mode, in a possible implementation mode of the second aspect, the feedback information carries at least one of the transmission pattern corresponding to the target data packet in the multiple data packets or the transmission sequence number of the target data packet.

In the solution, the receiver carries at least one of the transmission pattern corresponding to the target data packet or the transmission sequence number of the target data packet into the feedback information, such that the transmitter may determine whether the receiver correctly receive the target data packet.

In combination with the second aspect or any abovementioned possible implementation mode, in a possible implementation mode of the second aspect, the method may further include the following operation. The receiver receives indication information for the transmission pattern transmitted by the transmitter, wherein the indication information for the transmission pattern is configured to indicate a transmission pattern used by the transmitter for transmission of a subsequent data packet and the transmission pattern used for transmission of the subsequent data packet is determined by the transmitter based on the transmission pattern corresponding to the target data packet in the multiple data packets. The receiver receives the subsequent data packet transmitted by the transmitter with the transmission pattern used for transmission of the subsequent data packet.

In combination with the second aspect or any abovementioned possible implementation mode, in a possible implementation mode of the second aspect, the target data packet includes any one of the following data packets; a data packet which is not correctly received by the receiver; a data packet which is correctly received by the receiver; a data packet which is transmitted on the channel with best channel quality in the at least one channel used for transmission of the multiple data packets; a data packet which is transmitted on the channel with worst channel quality in the at least one channel used for transmission of the multiple data packets; a data packet with the worst detection error rate in the multiple data packets; or a data packet with the best detection error rate in the multiple data packets.

In the solution, the receiver carries at least one of the transmission pattern corresponding to the target data packet or the transmission sequence number of the target data packet in the feedback information, such that the transmitter may adjust the transmission pattern used for subsequent data transmission according to at least one of the transmission pattern corresponding to the target data packet or the transmission sequence number of the target data packet.

In combination with the second aspect or any abovementioned possible implementation mode, in a possible implementation mode of the second aspect, the operation that the receiver transmits the feedback information to the transmitter includes the following actions. The receiver transmits the ACK information to the transmitter as the feedback information to enable the transmitter to stop transmitting a data packet carrying the same information as that of the multiple data packets. The receiver transmits the NACK information to the transmitter as the feedback information to enable the transmitter to retransmit the data packet carrying the same information as that of the multiple data packets.

In the solution, the receiver may transmit the feedback information to the transmitter, such that the transmitter may timely adjust the subsequent data transmission condition according to the feedback information.

In combination with the second aspect or any abovementioned possible implementation mode, in a possible implementation mode of the second aspect, the transmission pattern is formed by at least one of the following transmission information: HARQ redundancy version information, frequency-domain resource information, time-domain resource information, beamforming vector information, subcarrier spacing information, duration information of the data transmission, pilot sequence information or scrambling sequence information.

According to a third aspect, the disclosure provides a device for data transmission. The device includes modules configured to execute the method in the first aspect.

According to a fourth aspect, the disclosure provides a device for data transmission. The device includes modules configured to execute the method in the second aspect.

According to a fifth aspect, the disclosure provides a device for data transmission. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor may execute the method according to the first aspect through the communication interface and control the input/output interface to receive input data and information and output data such as an operation result.

According to a sixth aspect, the disclosure provides a device for data transmission. The device includes a memory, a processor, an input/output interface, a communication interface and a bus system. The memory, the processor, the input/output interface and the communication interface are connected through the system bus. The memory may be configured to store an instruction. The processor may be configured to execute the instruction stored in the memory, and when the instruction is executed, the processor executes the method according to the second aspect through the communication interface and controls the input/output interface to receive input data and information and output data such as an operation result.

According to a seventh aspect, the disclosure provides a computer-readable storage medium. The computer-readable storage medium may be configured to store a program code for a search request transmission method, and the program code may be configured to execute method instructions in the first aspect.

According to an eighth aspect, the disclosure provides a computer-readable storage medium. The computer-readable storage medium may be configured to store a program code for a search request transmission method, and the program code may be configured to execute method instructions in the second aspect.

In some implementation modes, the preset timing relationship may refer to a fixed period of time between a moment when the receiver transmits the feedback information to the transmitter and a moment when the receiver receives the specified data packet.

In some implementation modes, the feedback information may be configured to indicate whether the receiver correctly receives at least part of the multiple data packets.

In some implementation modes, the multiple data packets carrying the same information may refer to multiple data packets carrying the same content.

In some implementation modes, the transmission information of the target data packet may be configured to indicate the transmission pattern of the target data packet.

According to the disclosure, such a data transmission mechanism that the transmitter continuously transmits the multiple data packets carrying the same information to the receiver until the transmitter receives the feedback information transmitted by the receiver and then determines subsequent data transmission according to the feedback information is adopted, so that the reliability of the data transmission may be improved.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

It should be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS) and LTE.

It is also to be understood that User Equipment (UE) may also be called a mobile terminal, a mobile user device and the like and may communicate with one or more core networks through, for example, a Radio Access Network (RAN). The UE may be a mobile terminal, for example, a mobile phone (or called as a "cellular" phone) and a computer with a mobile terminal, may be, for example, a portable, pocket, handheld, computer-embedded or vehicle-mounted mobile device and performs language and/or data exchange with the RAN.

A base station may be a Base Transceiver Station (BTS) in the GSM or CDMA, may also be a Node B in WCDMA and may further be an Evolutional Node B (eNB or e-NodeB) in LTE. There are no limits made in the disclosure. However, for convenient description, descriptions will be made in the following embodiments with a Node B as an example.

Figure 1:
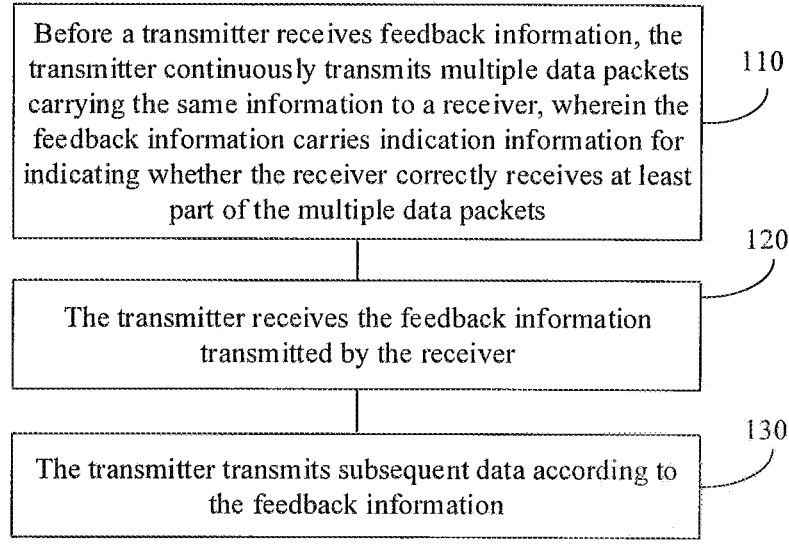
FIG. 1 is a schematic flowchart of a method for data transmission according to an embodiment of the disclosure.

FIG. 1 is a schematic flowchart of a method for data transmission according to an embodiment of the disclosure. The method illustrated in FIG. 1 includes the following operations.

In 110, before a transmitter receives feedback information, the transmitter continuously transmits multiple data packets carrying the same information to a receiver, wherein the feedback information carries indication information for indicating whether the receiver correctly receives at least part of the multiple data packets.

In 120, the transmitter receives the feedback information transmitted by the receiver.

In 130, the transmitter transmits subsequent data according to the feedback information.

Specifically, the transmitter may continuously transmit the multiple data packets including the same content to the receiver until the transmitter receives the feedback information transmitted by the receiver, and the transmitter transmits subsequent data according to the feedback information.

It should be understood that the transmitter may be a network-side device or a terminal device and the receiver may be a network-side device or a terminal device. That is, the transmitter and the receiver may be applied to a Device-to-Device (D2D) communication system. The transmitter and the receiver may also be applied to a cellular communication system. There are no specific limits made thereto in the disclosure.

In the solution, the transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In at least one embodiment, the operation that the transmitter continuously transmits the multiple data packets carrying the same information to the receiver includes that: the transmitter continuously transmits the multiple data packets to the receiver based on a transmission pattern respectively corresponding to each of the multiple data packets.

Specifically, each of the multiple data packets may correspond to a transmission pattern. The transmission pattern corresponding to each data packet in the multiple data packets may be the same and may also be different.

In the solution, each data packet in the multiple data packets carrying the same information may correspond to a transmission pattern, so that the transmitter may transmit the multiple data packets in a more flexible manner.

In at least one embodiment, the operation that the transmitter continuously transmits the multiple data packets carrying the same information to the receiver includes that: the transmitter continuously transmits the multiple data packets to the receiver based on at least two transmission patterns.

Specifically, the transmitter, when transmitting the multiple data packets, may transmit the multiple data packets based on different transmission patterns.

For example, the transmitter transmits three data packets carrying the same information to the receiver based on two different transmission patterns (for example, a transmission pattern 1 and a transmission pattern 2). The transmission pattern 1 may be used for transmission of the first data packet, the transmission pattern 2 may be used for transmission of the second data packet and the transmission pattern 1 may be used for transmission of the third data packet. In an alternative example, the transmission pattern 1 may be used for transmission of the first data packet and the third data packet, and the transmission pattern 2 may be used for transmission of the second data packet.

It should be understood that as described above, the transmitter transmits the three same data packets to the receiver based on the two different transmission patterns (for example, the transmission pattern 1 and the transmission pattern 2), which is merely as an example and there are no specific limits made to a sequential combination of the transmission patterns used for transmission of the multiple data packets in the disclosure.

In the solution, the transmitter may transmit the multiple data packets carrying the same information to the receiver based on different transmission patterns. Since diversified transmission patterns may improve diversity of data packet transmission manners, a probability that the receiver correctly receives the data packets is improved.

Figure 2:
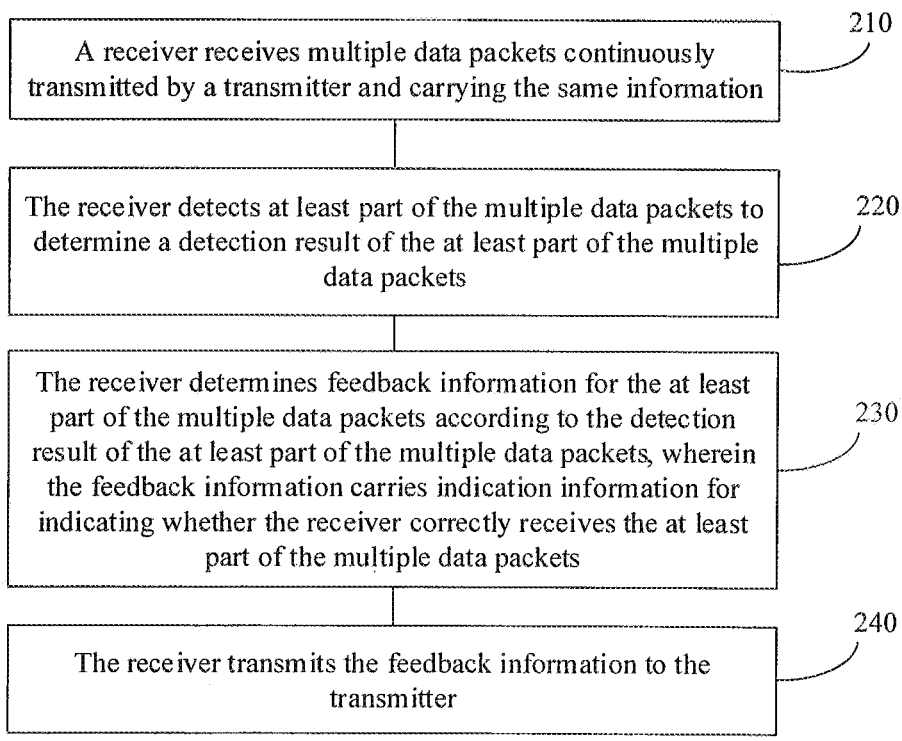
FIG. 2 is a schematic flowchart of a method for data transmission according to another embodiment of the disclosure.

FIG. 2 is a schematic flowchart of a method for data transmission according to an embodiment of the disclosure. The method illustrated in FIG. 2 includes the following operations.

In 210, a receiver receives multiple data packets continuously transmitted by a transmitter and carrying the same information.

In 220, the receiver detects at least part of the multiple data packets to determine a detection result of at least part of the multiple data packets.

In 230, the receiver determines feedback information for the at least part of the multiple data packets according to the detection result of the at least part of the multiple data packets, wherein the feedback information carries indication information for indicating whether the receiver correctly receives the at least part of the multiple data packets.

In 240, the receiver transmits the feedback information to the transmitter.

Specifically, the receiver may receive the multiple data packets which are continuously transmitted by the transmitter and carry the same content, and detect the at least part of the multiple data packets to determine the detection result of the at least part of data packets. Then, the receiver may transmit the feedback information to the transmitter according to the detection result to notify the transmitter whether the receiver correctly receives the information in the multiple data packets.

It is to be noted that the operations that the receiver receives the data packets and that the receiver detects the received data packets may be two independent processes. That is, the receiver may not detect all data packets in the received multiple data packets.

When the receiver transmits feedback information for any one of the multiple data packets to the transmitter and the feedback information contains ACK information, the receiver may detect a data packet that is transmitted by the transmitter in a time period when the ACK information is not received and carries a same content as that of the multiple data packets.

For example, the transmitter continuously transmits three data packets carrying the same information to the receiver and the receiver transmits feedback information carrying ACK information to the transmitter for the second data packet in the three data packets. Since the receiver transmits the feedback information with a latency, the transmitter, in such case, may have transmitted the third data packet to the receiver. The receiver may receive the third data packet and detect the third data packet (for example, the receiver is required to acquire a transmission effect of the third data packet transmitted through a transmission pattern corresponding to the third data packet). The receiver may also receive the third data packet only but not detect the third data packet.

It should be understood that that the transmitter may be a network-side device or a terminal device and the receiver may be a network-side device or a terminal device. There are no specific limits made thereto in the disclosure.

In the solution, the transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In at least one embodiment, the operation that the receiver receives the multiple data packets continuously transmitted by the transmitter and carrying the same information may include the following action. The receiver receives the multiple data packets that are continuously transmitted by the transmitter and carries the same information based on a transmission pattern respectively corresponding to each of the multiple data packets.

Specifically, each of the multiple data packets received by the receiver from the transmitter and including the same content may correspond to a transmission pattern.

In the solution, each of the multiple data packets carrying the same information may correspond to a transmission pattern, so that the transmitter may transmit the multiple data packets in a more flexible manner.

In at least one embodiment, the operation that the receiver receives the multiple data packets continuously transmitted by the transmitter and carrying the same information may include the following action. The receiver receives the multiple data packets transmitted by the transmitter and carrying the same information based on at least two transmission patterns.

Specifically, the receiver, when receiving the multiple data packets transmitted by the transmitter, may receive the multiple data packets based on different transmission patterns.

For example, the receiver receives three data packets transmitted by the transmitter and carrying the same information based on two different transmission patterns (for example, a transmission pattern 1 and a transmission pattern 2). The receiver may receive the first data packet based on the transmission pattern 1, the receiver may receive the second data packet based on the transmission pattern 2 and the receiver may receive the third data packet based on the transmission pattern 2.

It should be understood that as described above, the receiver receives the three same data packets from the transmitter based on the two different transmission patterns (for example, the transmission pattern 1 and the transmission pattern 2), which is merely as an example and there are no specific limits made to a sequential combination of the transmission patterns used for transmission of the multiple data packets in the disclosure.

In the solution, the receiver may receive the multiple data packets transmitted by the transmitter and carrying the same information based on different transmission patterns. Since diversified transmission patterns may improve diversity of data packet transmission manners, a probability that the receiver correctly receives the data packets is improved.

In at least one embodiment, the operation that the receiver detects the at least part of the multiple data packets may include the following action. The receiver detects each of the multiple data packets, or the receiver performs joint detection on at least two data packets in the multiple data packets.

Specifically, the receiver may detect each data packet in the multiple data packets transmitted by the transmitter to determine a detection result of each data packet. In an alternative example, the receiver may perform joint detection on a group of data packets (i.e., at least two data packets) in the multiple data packets to determine a detection result of the group of the data packets.

It should be understood that the receiver may independently detect each of the multiple data packets and the receiver may also perform joint detection on the at least part of the multiple data packets. There are no specific limits made to a method by which the receiver detects the multiple data packets in the disclosure.

In the solution, the receiver may independently detect the multiple data packets transmitted by the transmitter or perform joint detection on the at least part of data packets in the multiple data packets, so that the receiver may detect the data packets in diversified manners to improve the flexibility of data packet detection.

Figure 3:
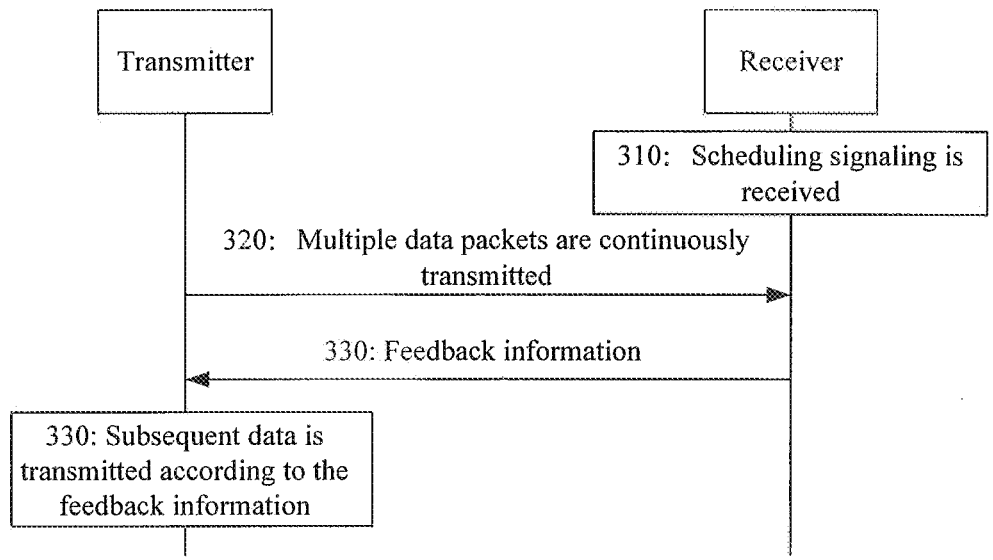
FIG. 3 is a schematic flowchart of a method for data transmission according to another embodiment of the disclosure.

The method for data transmission according to the embodiments of the disclosure will be introduced below in combination with a specific method flow in detail. FIG. 3 is a schematic flowchart of a method for data transmission according to another embodiment of the disclosure. It should be understood that FIG. 3 illustrates detailed actions or operations of the method for data transmission. However, these actions or operations are only examples. Other operations or transformations of each operation in FIG. 3 may also be executed in the embodiment of the disclosure. In addition, each operation in FIG. 3 may be executed in a sequence different from that illustrated in FIG. 3 and not all the operations in FIG. 3 may be executed. The operations illustrated in FIG. 3 will be specifically described below.

In 310, a receiver receives a scheduling signaling.

Specifically, a transmitter may transmit a scheduling signaling to the receiver to indicate the receiver to receive multiple data packets. The transmitter may also transmit multiple scheduling signalings to the receiver. Since the multiple scheduling signalings are in one-to-one correspondence with the multiple data packets, each scheduling signaling may indicate the receiver to receive the data packet corresponding to the scheduling signaling.

For example, when the transmitter is a base station, the receiver may receive a DCI transmitted by the base station. The DCI may be configured to indicate the receiver to receive the multiple data packets transmitted by the transmitter. That is, the base station may schedule the receiver to receive the multiple data packets through the DCI.

The receiver may receive multiple DCI transmitted by the base station. Each of the multiple DCI corresponds to one of the multiple data packets and each DCI may be configured to indicate the receiver to receive the data packet corresponding to the DCI. That is, the base station may schedule the receiver to receive the multiple data packets through the multiple DCI, and each DCI may be configured to schedule the receiver to receive the data packet corresponding to the DCI.

It is to be noted that, when the transmitter is the base station, the transmitter may transmit the DCI to the receiver. When the transmitter is not the base station, the base station may transmit the DCI to the receiver. That is, this is similar to the condition that a base station transmits scheduling information to a receiver (terminal) in a D2D communication system.

In 320, a transmitter continuously transmits multiple data packets carrying the same information to the receiver.

Specifically, the transmitter continuously transmits the multiple data packets carrying the same information to the receiver until the transmitter receives feedback information transmitted by the receiver.

The multiple data packets carrying the same information may refer to multiple data packets carrying the same information. That is, information bits of parts of a destination Internet Protocol (IP) address, a source IP address, payload data and the like in the multiple data packets are the same.

It should be understood that that the transmitter may be a network-side device or a terminal device and the receiver may be a network-side device or a terminal device. There are no specific limits made thereto in the disclosure.

In at least one embodiment, the multiple data packets are transmitted by use of a transmission pattern respectively corresponding to each of the multiple data packets. The transmission pattern corresponding to each data packet is predetermined by the transmitter and the receiver. In an alternative embodiment, the transmission pattern corresponding to each data packet is transmitted to the receiver by the transmitter through the signaling.

Specifically, the transmission pattern corresponding to each of the multiple data packets may be predetermined by the transmitter and the receiver. For example, time-frequency resources used for transmission of the multiple data packets may be time-frequency resources that adopt a fixed frequency hopping pattern on continuous subframes. The transmission pattern corresponding to each of the multiple data packets is transmitted to the receiver by the transmitter through the signaling. For example, the transmitter may carry the transmission pattern corresponding to each data packet in high-layer signaling or DCI for transmitting to the receiver.

It should be understood that the transmitter may transmit the multiple data packets based on a transmission pattern and the transmitter may transmit the multiple data packets based on multiple transmission patterns. There are no specific limits made thereto in the disclosure.

In at least one embodiment, the operation that the transmitter continuously transmits the multiple data packets carrying the same information to the receiver includes the following action. The transmitter continuously transmits the multiple data packets to the receiver based on at least two transmission patterns.

For example, the transmitter transmits three same data packets to the receiver based on two different transmission patterns (for example, a transmission pattern 1. and a transmission pattern 2). The transmission pattern 1 may be used for transmission of the first data packet, the transmission pattern 2 may be used for transmission of the second data packet and the transmission pattern 1 may be used for transmission of the third data packet. In an alternative example, the transmission pattern 1 may be used for transmission of the first data packet and the third data packet, and the transmission pattern 2 may be used for transmission of the second data packet.

It should be understood that as described above, the transmitter transmits the three same data packets to the receiver based on the two different transmission patterns (for example, the transmission pattern 1 and the transmission pattern 2), which is merely as an example and there are no specific limits made to a sequential combination of the transmission patterns used for transmission of the multiple data packets in the disclosure.

In 320, the receiver transmits feedback information to the transmitter.

In at least one embodiment, the feedback information carries indication information configured to indicate whether the receiver correctly receives the first data packet in the multiple data packets. The first data packet may be any data packet in the multiple data packets.

Figure 4:
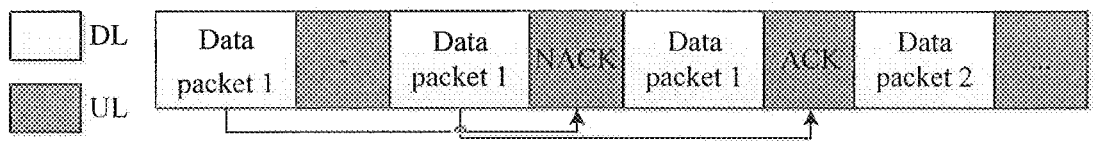
FIG. 4 is a schematic diagram of Uplink (UL) and Downlink (DL) data transmission in a Time Division Duplexing (TDD) manner according to another embodiment of the disclosure.

FIG. 4 is a schematic diagram of UL and DL data transmission in a TDD manner according to another embodiment of the disclosure. The method for data transmission will be described below with UL and DL data transmission in the TDD manner in FIG. 4 as an example in detail. Assume that the transmitter transmits a data packet and a relatively long feedback latency is required for reception of feedback information corresponding to the data packet. As illustrated in FIG. 4, feedback information for a first data packet (time when the transmitter transmits the first data packet 1 in FIG. 4) transmitted by the transmitter through a DL may be received (referring to time when the transmitter receives a NACK message in FIG. 4) after transmission time of an Nth data packet (time when the transmitter transmits the Nth data packet 1 in FIG. 4). That is, the transmitter, when transmitting data, is not required to determine whether to retransmit a second data packet 1 according to the feedback information for the first data packet 1. The transmitter may continuously transmit the data packet 1 in a time period when the feedback information for the first data packet 1 is not received until receiving the feedback information, transmitted by the receiver through a UL, for the first data packet 1. When the feedback information, received by the transmitter, for the first data packet 1 is NACK information, the transmitter may continue transmitting (retransmit) the data packet 1. When the feedback information, received by the transmitter, for the first data packet 1 is ACK information, the transmitter may stop transmitting the data packet 1 and, in such case, the transmitter may transmit a new data packet (referring to a data packet 2 in FIG. 4).

In at least one embodiment, the feedback information includes indication information configured to indicate whether the receiver correctly receives at least two data packets in the multiple data packets.

Specifically, the receiver may perform joint detect on the multiple data packets to acquire the content of the data packets only after receiving the multiple data packets transmitted by the transmitter and carrying the same information. For example, when the receiver may analyze the content of the data packets only after receiving any three data packets in the multiple data packets transmitted by the transmitter, the feedback information transmitted to the transmitter by the receiver may be feedback information for the any three data packets in the multiple data packets. That is, when the receiver correctly receives the any three data packets in the multiple data packets, the receiver may transmit ACK information to the transmitter. When the receiver does not correctly receive the any three data packets in the multiple data packets, the receiver may transmit NACK information to the transmitter.

In at least one embodiment, the feedback information carries indication information configured to indicate whether the receiver correctly receives the information in the multiple data packets.

Specifically, the multiple data packets carrying the same information may be understood that data packets carrying the same information are transmitted for many times. Therefore, from this point of view, the feedback information may indicate whether the receiver correctly receives the information included in the data packets.

In at least one embodiment, the feedback information carries at least one of a transmission pattern corresponding to a target data packet in the multiple data packets or a transmission sequence number of the target data packet.

Figure 5:
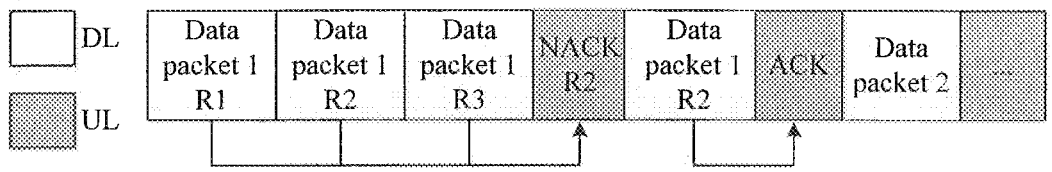
FIG. 5 is a schematic diagram of UL and DL data transmission in a TDD manner according to another embodiment of the disclosure.

FIG. 5 is a schematic diagram of UL and DL data transmission in a TDD manner according to another embodiment of the disclosure. The method for data transmission will be described below with UL and DL data transmission in the TDD manner in FIG. 5 as an example in detail. As illustrated in FIG. 5, the transmitter may continuously transmit multiple data packets (referring to data packets 1 in FIG. 5) carrying the same information through a DL and the receiver may transmit feedback information to the transmitter through a UL according to a detection result of the data packets (the data packets 1) transmitted for many times. Descriptions will be made in FIG. 5 regarding whether the receiver correctly receives three data packets 1 transmitted by the transmitter as an example. When the receiver does not correctly receive the three data packets 1 transmitted by the transmitter, the receiver may transmit NACK information to the transmitter as the feedback information. The receiver may carry a transmission sequence number (referring to R2 illustrated in FIG. 5) corresponding to worst channel quality in the three data packets transmitted by the transmitter into the NACK information. The transmitter may retransmit the data packet corresponding to the sequence number based on a transmission pattern corresponding to the data packet. When the receiver correctly receives the data packet 1 which is retransmitted by the transmitter and corresponds to the sequence number R2, the receiver may transmit ACK information to the transmitter and, in such case, the transmitter may transmit a new data packet (referring to a data packet 2 in FIG. 5). When the receiver correctly receives the three data packets 1 transmitted by the transmitter, the receiver may transmit the ACK information (not illustrated in FIG. 5) to the transmitter. In such case, the transmitter may transmit the new data packet.

Figure 6:
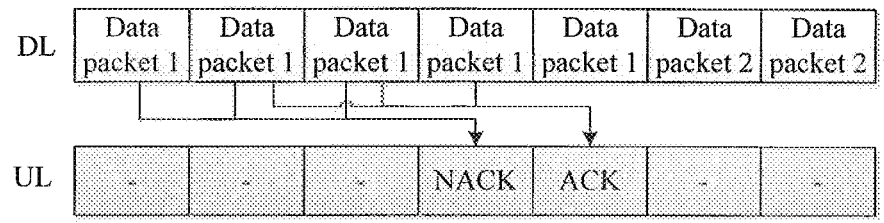
FIG. 6 is a schematic diagram of UL and DL data transmission in a Frequency Division Duplexing (FDD) manner according to another embodiment of the disclosure.

FIG. 6 is a schematic diagram of UL and DL data transmission in an FDD manner according to another embodiment of the disclosure. The method for data transmission will be described below with UL and DL data transmission in the FDD manner in FIG. 6 as an example in detail. As illustrated in FIG. 6, the transmitter may continuously transmit data packets (data packets 1) carrying the same information for many times (for example, 5 times in FIG. 6) on a DL subframe. The receiver, after receiving N continuous (for example, 3 in FIG. 6) data packets, performs joint detect on the N data packets. Assume that the second data packet 1, third data packet 1 and fourth data packet 1 illustrated in FIG. 6 include all HARQ redundancy versions of the data packet 1. That is, the receiver may perform joint detect on the data packet 1 only after receiving the three HARQ redundancy versions of the data packet 1. Therefore, when the receiver transmits feedback information to the transmitter through a UL, the feedback information is configured to indicate whether the receiver correctly receives all the HARQ redundancy versions of the data packet 1. The transmitter, when receiving NACK information, may continue transmitting the data packet 1. The transmitter, when receiving ACK information, may stop transmitting the data packet and transmit a new data packet 2.

In at least one embodiment, the feedback information carries indication information configured to indicate whether the receiver correctly receives a specified data packet in the multiple data packets transmitted by the transmitter. The specified data packet may be a data packet having a preset timing relationship with the feedback information.

Specifically, the feedback information is configured to indicate whether the specified data packet in the multiple data packets is correctly received by the receiver. The feedback information and the specified data packet have the preset timing relationship. The preset timing relationship may refer to a fixed time period between a moment when the receiver transmits the feedback information to the transmitter and a moment when the receiver receives the specified data packet.

The preset timing relationship between the feedback information and the specified data packet will be described with the condition that the feedback information and the specified data packet are spaced by a predetermined fixed number of transmission time intervals as an example. It should be understood that the preset timing relationship of the embodiment of the disclosure is not limited thereto.

Assume that the predetermined fixed number of the transmission time intervals between the feedback information and the specified data packet is 3. That is, there are three transmission time intervals between the feedback information and the specified data packet. When the transmitter receives the feedback information, the feedback information is configured to indicate whether the data packet at three transmission time intervals before the feedback information is correctly received by the receiver.

In at least one embodiment, the preset timing relationship is a timing relationship predetermined by the transmitter and the receiver. In an alternative embodiment, the preset timing relationship is indicated to the receiver by the transmitter through signaling.

Specifically, the preset timing relationship predetermined by the transmitter and the receiver may refer to that the transmitter and the receiver determine the preset timing relationship through a protocol and may also refer to that the preset timing relationship is manually set in the transmitter and the receiver.

That the preset timing relationship is transmitted to the receiver by the transmitter through the signaling may refer to that the transmitter transmits the signaling to the receiver, the signaling including the preset timing relationship. For example, when the transmitter is a base station, the transmitter may transmit DCI to the receiver and the DCI carries the preset timing relationship.

It should be understood that, when both of the transmitter and the receiver are terminals (it can be understood that the transmitter and the receiver perform D2D communication), the preset timing relationship is transmitted to the receiver by the transmitter, may also be transmitted to the transmitter and the receiver by the base station respectively and may further be transmitted to the base station by the transmitter and then transmitted to the receiver by the base station. There are no specific limits made to a configuration manner for preset timing information in the disclosure.

In 330, the transmitter transmits subsequent data according to the feedback information.

In at least one embodiment, the operation that the transmitter transmits the subsequent data according to the feedback information carries the following action. The transmitter determines a transmission pattern corresponding to a target data packet according to feedback information. The transmitter determines a transmission pattern used for transmission of the subsequent data according to the transmission pattern corresponding to the target data packet. The transmitter transmits the subsequent data with the transmission pattern used for transmission of the subsequent data.

In at least one embodiment, the target data packet includes any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

Specifically, when the receiver carries at least one of the transmission pattern corresponding to the target data packet or the transmission sequence number of the target data packet in the feedback information (NACK information), the target data packet may include any one of the following data packets: the data packet which is not correctly received by the receiver, the data packet which is transmitted on the channel with worst channel quality in the at least one channel used for transmission of the multiple data packets or the data packet with the best detection error rate in the multiple data packets.

Specifically, when the receiver carries at least one of the transmission pattern corresponding to the target data packet or the transmission sequence number of the target data packet in the feedback information (ACK information), the target data packet may include any one of the following data packets: the data packet which is correctly received by the receiver, the data packet which is transmitted on the channel with best channel quality in the at least one channel used for transmission of the multiple data packets or the data packet with the worst detection error rate in the multiple data packets.

It should be understood that, when the target data packet includes the data packet which is transmitted on the channel with worst channel quality in the at least one channel used for transmission of the multiple data packets, at least one of the transmission pattern corresponding to the target data packet or the transmission sequence number of the target data packet may also be included in the ACK information. That is, although the target data packet is correctly received by the receiver, the channel quality of the channel used for transmission of the data packet is worst. There are no specific limits made to including different types of target data packets into the ACK information or the NACK information in the disclosure.

In at least one embodiment, the target data packet may further include a data packet which is transmitted on the channel with relatively poor channel quality in the channels used by the transmitter for transmission of the multiple data packets. That is, a first channel quality threshold may be set on a receiver side. When channel quality of any channel in the channels used for transmission of the data packets is lower than the channel quality threshold, the data packet transmitted on the channel may be determined as the target data packet. Similarly, the target data packet may further include a data packet which is transmitted on the channel with relatively higher channel quality in the channels used by the transmitter for transmission of the multiple data packets. That is, a second channel quality threshold may also be set on the receiver side. When the channel quality of any channel in the channels used for transmission of the data packets is higher than the channel quality threshold, the data packet transmitted on the channel may be determined as the target data packet.

It should be understood that the first channel quality threshold and the second channel quality threshold may be the same or the first channel quality threshold may also be lower than the second channel quality threshold.

In at least one embodiment, the target data packet may further include a data packet with a relatively high detection error rate in the multiple data packets detected by the receiver. That is, a first detection error rate threshold may be set on the receiver side. When a detection error rate of any of the multiple data packets is higher than the first detection error rate threshold, the data packet may be determined as the target data packet. Similarly, the target data packet may further include a data packet with a relatively low detection error rate in the multiple data packets detected by the receiver. That is, a second detection error rate threshold may be set on the receiver side. When the detection error rate of any of the multiple data packets is lower than the second detection error rate threshold, the data packet may be determined as the target data packet.

It should be understood that the first detection error rate threshold and the second detection error rate threshold may be the same or the first detection error rate threshold may also be higher than the second detection error rate threshold.

It is also to be understood that a type of the target data packet in the feedback information may be stored in the transmitter and the receiver in form of predetermination by the transmitter and the receiver. A type identifier corresponding to the target data packet may also be stored in the transmitter and the receiver. The feedback information carries the type identifier of the data packet, so that the transmitter and the receiver may adjust the transmission patterns for the subsequent data packets according to the transmission pattern corresponding to the target data packet.

There are no specific limits made to a manner in which the transmitter and the receiver acquire the type of the target data packet in the disclosure.

In at least one embodiment, the operation that the transmitter transmits the subsequent data according to the feedback information includes the following action. When the feedback information is ACK information, the transmitter stops transmitting a data packet carrying the same information as that of the multiple data packets. When the feedback information is MACK information, the transmitter transmits the data packet carrying the same information as that of the multiple data packets.

It is to be noted that, when the feedback information is the ACK information, the transmitter stops transmitting the data packet carrying the same information as that of the multiple data packets, the transmitter may transmit a new data packet (i.e., a data packet carrying information different from that of the multiple data packets) to the receiver and the transmitter may also stop transmitting data to the receiver. There are no specific limits made thereto in the disclosure.

In at least one embodiment, the method further includes the following operations. When a number of transmissions of the multiple data packets by the transmitter is more than or equal to a preset threshold, the transmitter stops transmitting the data packet carrying the same information as that of the multiple data packets.

Specifically, when the number of transmissions of the data packet carrying the same information as that of the multiple data packets by the transmitter is more than or equal to a preset number of transmissions, that is, when the number of transmissions of the data packet carrying the same information as that of the multiple data packets by the transmitter exceeds the preset number of transmissions, the transmitter stops transmitting the data packet carrying the same content as that of the multiple data packets. The transmitter may transmit a new data packet (i.e., a data packet carrying a content different from that of the multiple data packets) to the receiver and the transmitter may also stop transmitting data to the receiver.

It is to be noted that during the procedure that the transmitter transmits the multiple data packets to the receiver, when the feedback information received by the transmitter from the receiver is the NACK information (i.e., feedback information carrying the NACK information) and when the number of the multiple data packets transmitted by the transmitter is more than or equal to the preset threshold, the transmitter may also stop transmitting the data packet carrying the same content as that of the multiple data packets to the receiver.

In at least one embodiment, the transmission pattern is formed by at least one of the following transmission information: HARQ redundancy version information, frequency-domain resource information, time-domain resource information, beamforming vector information, subcarrier spacing information, duration information of the data transmission, pilot sequence information or scrambling sequence information.

The method for data transmission according to the embodiments of the disclosure is described above in combination with FIG. 1 to FIG. 6 in detail. A device for data transmission according to the embodiments of the disclosure will be described below in combination with FIG. 7 to FIG. 10 in detail. It should be understood that the device illustrated in FIG. 7 to FIG. 10 may implement each operation in FIG. 3 and will not be elaborated herein for avoiding repetitions.

Figure 7:
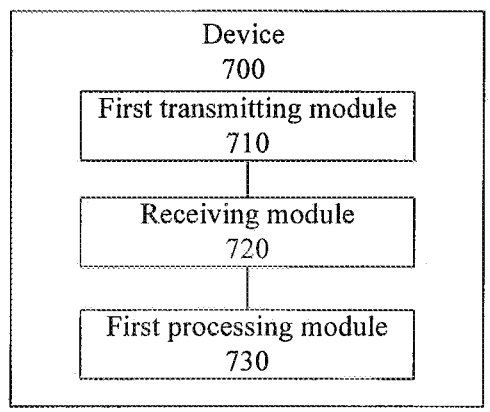
FIG. 7 is a schematic block diagram of a device for data transmission according to an embodiment of the disclosure.

FIG. 7 is a schematic block diagram of a device for data transmission according to an embodiment of the disclosure. The device 700 illustrated in FIG. 7 includes a first transmitting module 710, a receiving module 720 and a first processing module 730.

The first transmitting module 710 is configured to continuously transmit multiple data packets carrying the same information to a receiver before feedback information is received, wherein the feedback information carrying indication information for indicating whether the receiver correctly receives at least part of the multiple data packets.

The receiving module 720 is configured to receive the feedback information transmitted by the receiver.

The first processing module 730 is configured to transmit subsequent data according to the feedback information.

In the solution, a transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In at least one embodiment, the first transmitting module may be specifically configured to continuously transmit the multiple data packets to the receiver based on a transmission pattern respectively corresponding to each of the multiple data packets.

In at least one embodiment, the first transmitting module may further be specifically configured to transmit the multiple data packets to the receiver based on at least two transmission patterns.

In at least one embodiment, the feedback information carries transmission information of a target data packet in the multiple data packets. The first processing module may be specifically configured to determine the transmission pattern corresponding to the target data packet according to the transmission information of the target data packet, determine a transmission pattern for transmission of the subsequent data according to the transmission pattern corresponding to the target data packet and transmit the subsequent data with the transmission pattern for transmission of the subsequent data.

In at least one embodiment, the transmission information of the target data packet may include at least one of a transmission pattern corresponding to the target data packet or a transmission sequence number of the target data packet.

In at least one embodiment, the target data packet may include any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In at least one embodiment, the transmission information in the transmission pattern may include at least one of: HARQ redundancy version information, frequency-domain resource information, time-domain resource information, beamforming vector information, subcarrier spacing information, duration information of the data transmission, pilot sequence information or scrambling sequence information.

In at least one embodiment, the transmission pattern corresponding to each of the multiple data packets may be predetermined by the transmitter and the receiver. In an alternative embodiment, the transmission pattern corresponding to each of the multiple data packets may be transmitted to the receiver by the transmitter through the signaling.

In at least one embodiment, the feedback information may carry indication information for indicating whether the receiver correctly receives a specified data packet in the multiple data packets transmitted by the transmitter. The specified data packet may be a data packet having a preset timing relationship with the feedback information.

In at least one embodiment, the preset timing relationship may be a timing relationship predetermined by the transmitter and the receiver. In an alternative embodiment, the preset timing relationship may be indicated to the receiver by the transmitter through signaling.

In at least one embodiment, the feedback information may carry any one of the following indication information: indication information for indicating whether the receiver correctly receives the first data packet in the multiple data packets, the first data packet being any data packet in the multiple data packets; indication information for indicating whether the receiver correctly receives at least two data packets in the multiple data packets; or indication information for indicating whether the receiver correctly receives the information contained in the multiple data packets or not.

In at least one embodiment, the first processing module may further be specifically configured to, responsive to determining that the feedback information carries ACK information, stop transmitting a data packet carrying the same information as that of the multiple data packets and, responsive to determining that the feedback information carries NACK information, transmit the data packet carrying the same information as that of the multiple data packets.

In at least one embodiment, the device may further include a second processing module. The second processing module may be configured to, when the number of the transmitted multiple data packets is more than or equal to a preset threshold value, stop transmitting the data packet carrying the same information as that of the multiple data packets.

In at least one embodiment, the device may further include a second transmitting module. The second transmitting module may be configured to transmit a scheduling signaling to the receiver, wherein the scheduling signaling may be configured to indicate the receiver to receive the multiple data packets, or transmit multiple scheduling signalings to the receiver, wherein the multiple scheduling signalings may be in one-to-one correspondence with the multiple data packets and each scheduling signaling may be configured to indicate the receiver to receive the data packet corresponding to the scheduling signaling.

Figure 8:
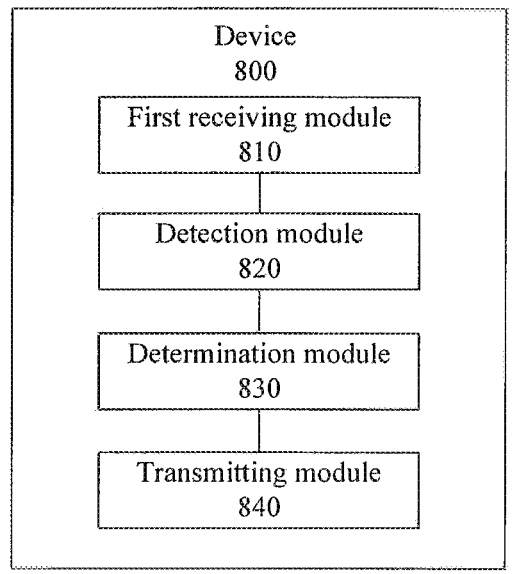
FIG. 8 is a schematic block diagram of a device for data transmission according to another embodiment of the disclosure.

FIG. 8 is a schematic block diagram of a device for data transmission according to another embodiment of the disclosure. The device 800 illustrated in FIG. 8 includes a first receiving module 810, a detection module 820, a determination module 830 and a transmitting module 840.

The first receiving module 810 is configured to receive multiple data packets continuously transmitted by a transmitter and carrying the same information.

The detection module 820 is configured to detect at least part of the multiple data packets to determine a detection result of the at least part of the multiple data packets.

The determination module 830 is configured to determine feedback information for the at least part of the multiple data packets according to the detection result of the at least part of the multiple data packets. The feedback information carries indication information configured to indicate whether the receiver correctly receives the at least part of the multiple data packets.

The transmitting module 840 is configured to transmit the feedback information to the transmitter.

In the solution, the transmitter may continuously transmit the multiple data packets carrying the same information to a receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In at least one embodiment, the first receiving module may be specifically configured to receive the multiple data packets continuously transmitted by the transmitter and carrying the same information based on a transmission pattern respectively corresponding to each of the multiple data packets.

In at least one embodiment, the first receiving module may further be specifically configured to receive the multiple data packets transmitted by the transmitter and carrying the same information based on at least two transmission patterns.

In at least one embodiment, the transmitting module may be specifically configured to transmit the feedback information to the transmitter, wherein the feedback information carries information for indicating at least one of a transmission pattern corresponding to a target data packet in the multiple data packets or a transmission sequence number of the target data packet.

In at least one embodiment, the target data packet may include any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In at least one embodiment, the transmission pattern may be formed by at least one of the following transmission information: HARQ redundancy version information, frequency-domain resource information, time-domain resource information, beamforming vector information, subcarrier spacing information, duration information of the data transmission, pilot sequence information or scrambling sequence information.

In at least one embodiment, the transmission pattern corresponding to each of the multiple data packets may be predetermined by the transmitter and the receiver. In an alternative embodiment, the transmission pattern corresponding to each of the multiple data packets may be transmitted to the receiver by the transmitter through the signaling.

In at least one embodiment, the transmitting module may further be specifically configured to transmit the feedback information to the transmitter, wherein the feedback information carries indication information for indicating whether the receiver correctly receives a specified data packet in the multiple data packets transmitted by the transmitter and the specified data packet has a preset timing relationship with the feedback information.

In at least one embodiment, the preset timing relationship may be a timing relationship predetermined by the transmitter and the receiver. In an alternative embodiment, the preset timing relationship may be indicated to the receiver by the transmitter through signaling.

In at least one embodiment, the feedback information may carry any one of the following indication information: indication information for indicating whether the receiver correctly receives the first data packet in the multiple data packets, the first data packet being any data packet in the multiple data packets; indication information for indicating whether the receiver correctly receives at least two data packets in the multiple data packets; or indication information for indicating whether the receiver correctly receives the information in the multiple data packets.

In at least one embodiment, the device may further include a second receiving module. The second receiving module may be configured to receive a scheduling signaling transmitted by the transmitter, wherein the scheduling signaling is configured to indicate the receiver to receive the multiple data packets, or receive multiple scheduling signalings, wherein the multiple scheduling signalings are in one-to-one correspondence with the multiple data packets and each scheduling signaling is configured to indicate the receiver to receive the data packet corresponding to the scheduling signaling.

In at least one embodiment, the detection module may further be specifically configured to detect each data packet in the multiple data packets or perform joint detection on at least two data packets in the multiple data packets.

Figure 9:
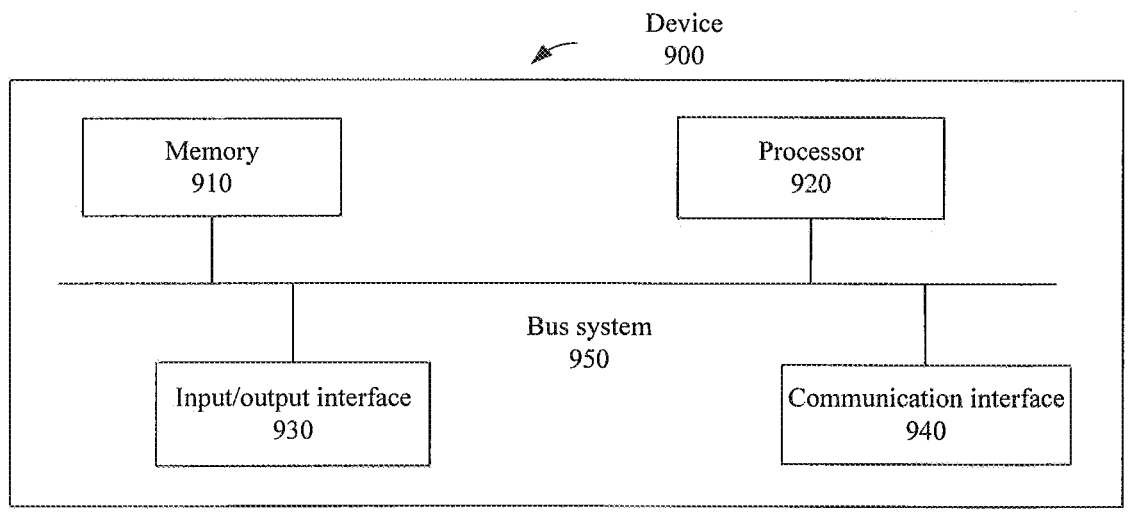
FIG. 9 is a schematic block diagram of a device for data transmission according to another embodiment of the disclosure.

FIG. 9 is a schematic block diagram of a device for data transmission according to another embodiment of the disclosure. The device 900 illustrated in FIG. 9 includes a memory 910, a processor 920, an input/output interface 930, a communication interface 940 and a bus system 950. The memory 910, the processor 920, the input/output interface 930 and the communication interface 940 are connected through the bus system 950. The memory 910 may be configured to store an instruction. The processor 920 may be configured to execute the instruction stored in the memory 910 to control the input/output interface 930 to receive input data and information and output data such as an operation result and control the communication interface 940 to transmit a signal.

The communication interface 940 may be configured to continuously transmit multiple data packets carrying the same information to a receiver.

The communication interface 940 may be further configured to receive feedback information transmitted by the receiver, wherein the feedback information may be configured to indicate whether the receiver correctly receives at least part of the multiple data packets.

The processor 920 may be configured to transmit subsequent data according to the feedback information.

It should be understood that in the embodiment of the disclosure, the processor 920 may adopt a universal Central Processing Unit (CPU), a microprocessor, an Application Specific Integrated Circuit (ASIC) or one or more integrated circuits, and may be configured to execute a related program to implement the technical solution provided in the embodiments of the disclosure.

It is also to be understood that the communication interface 940 uses, for example, but not limited to, a transceiver device such as a transceiver to implement communication between the mobile terminal 900 and another device or a communication network.

The memory 910 may include a Read-Only Memory (ROM) and a Random Access Memory (RAM) and provides an instruction and data to the processor 920. A part of the processor 920 may further include a nonvolatile RAM. For example, the processor 920 may further store information of a device type.

The bus system 950 may include a data bus, and may further include a power bus, a control bus, a state signal bus and the like. However, for clear description, various buses in the figure are marked as the bus system 950.

In an implementation process, each operation of the method may be completed by an integrated logic circuit of hardware in the processor 920 or an instruction in a software form. The method for data transmission disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 910. The processor 920 reads information in the memory 910 and completes the operations of the method in combination with hardware. No more detailed descriptions will be made herein to avoid repetitions.

In the solution, a transmitter may continuously transmit the multiple data packets carrying the same information to the receiver until the transmitter receives the feedback information transmitted by the receiver, and then the transmitter determines subsequent data transmission according to the feedback information. In such a data transmission mechanism, since the transmitter keeps transmitting the data packets carrying the same information to the receiver, the reliability of the data transmission may be improved.

Meanwhile, according to the data transmission mechanism, during the procedure that the receiver performs data detection on the data packets and transmits the feedback information, the transmitter may keep transmitting the multiple data packets carrying the same information to the receiver, so that data transmission latency may be shortened. For example, when the receiver has not correctly received a first data packet and the subsequent data packets carrying the same information have been transmitted to the receiver by the transmitter, the receiver may re-detect the subsequent data packets carrying the same information immediately, without waiting the transmitter to retransmit the data packet carrying the same information after the receiver transmits the feedback information to the transmitter, like an existing data transmission mechanism.

In at least one embodiment, the communication interface may be specifically configured to continuously transmit the multiple data packets to the receiver based on a transmission pattern respectively corresponding to each of the multiple data packets.

In at least one embodiment, the communication interface may further be specifically configured to continuously transmit the multiple data packets to the receiver based on at least two transmission patterns.

In at least one embodiment, the feedback information may carry transmission information of a target data packet in the multiple data packets. A first processing module may be specifically configured to determine the transmission pattern corresponding to the target data packet according to the transmission information of the target data packet, determine a transmission pattern for transmission of the subsequent data according to the transmission pattern corresponding to the target data packet and transmit the subsequent data with the transmission pattern for transmission of the subsequent data.

In at least one embodiment, the transmission information of the target data packet may include at least one of a transmission pattern corresponding to the target data packet or a transmission sequence number of the target data packet.

In at least one embodiment, the target data packet may include any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In at least one embodiment, the transmission information in the transmission pattern may include at least one of: HARQ redundancy version information, frequency-domain resource information, time-domain resource information, beamforming vector information, subcarrier spacing information, duration information of the data transmission, pilot sequence information or scrambling sequence information.

In at least one embodiment, the transmission pattern corresponding to each of the multiple data packets may be predetermined by the transmitter and the receiver, or the transmission pattern corresponding to each of the multiple data packets may be transmitted to the receiver by the transmitter through the signaling.

In at least one embodiment, the feedback information may carry indication information configured to indicate whether the receiver correctly receives a specified data packet in the multiple data packets transmitted by the transmitter. The specified data packet may be a data packet having a preset timing relationship with the feedback information.

In at least one embodiment, the preset timing relationship may be a timing relationship predetermined by the transmitter and the receiver, or the preset timing relationship may be indicated to the receiver by the transmitter through signaling.

In at least one embodiment, the feedback information may carry any one of the following indication information: indication information for indicating whether the receiver correctly receives the first data packet in the multiple data packets, the first data packet being any data packet in the multiple data packets; indication information for indicating whether the receiver correctly receives at least two data packets in the multiple data packets; or indication information for indicating whether the receiver correctly receives the information in the multiple data packets.

In at least one embodiment, the processor may further be specifically configured to, responsive to determining that the feedback information carries ACK information, stop transmitting a data packet carrying the same information as that of the multiple data packets and, responsive to determining that the feedback information carries NACK information, transmit the data packet carrying the same information as that of the multiple data packets.

In at least one embodiment, the processor may further be configured to, when the number of the multiple data packets transmitted by the transmitter is more than or equal to a preset threshold value, stop transmitting the data packet carrying the same information as that of the multiple data packets.

In at least one embodiment, the communication interface may be configured to transmit a scheduling signaling to the receiver, wherein the scheduling signaling is configured to indicate the receiver to receive the multiple data packets, or transmit multiple scheduling signalings to the receiver, wherein the multiple scheduling signalings are in one-to-one correspondence with the multiple data packets and each scheduling signaling is configured to indicate the receiver to receive the data packet corresponding to the scheduling signaling.

In at least one embodiment, the communication interface may be specifically configured to continuously transmit the multiple data packets to the receiver based on the transmission pattern respectively corresponding to each of the multiple data packets.

In at least one embodiment, the communication interface may further be specifically configured to continuously transmit the multiple data packets to the receiver based on the at least two transmission patterns.

In at least one embodiment, the feedback information may carry the transmission information of the target data packet in the multiple data packets. The first processing module may be specifically configured to determine the transmission pattern corresponding to the target data packet according to the transmission information of the target data packet, determine the transmission pattern for transmission of the subsequent data according to the transmission pattern corresponding to the target data packet and transmit the subsequent data with the transmission pattern for transmission of the subsequent data.

In at least one embodiment, the transmission information of the target data packet may include at least one of the transmission pattern corresponding to the target data packet or the transmission sequence number of the target data packet.

In at least one embodiment, the target data packet may include any data packet in the following data packets: the data packet which is not correctly received by the receiver; the data packet which is correctly received by the receiver; the data packet which is transmitted on the channel with best channel quality in the at least one channel used for transmission of the multiple data packets; the data packet which is transmitted on the channel with worst channel quality in the at least one channel used for transmission of the multiple data packets; the data packet with the worst detection error rate in the multiple data packets; or the data packet with the best detection error rate in the multiple data packets.

In at least one embodiment, the transmission information in the transmission pattern may include at least one of: the HARQ redundancy version information, the frequency-domain resource information, the time-domain resource information, the beamforming vector information, the subcarrier spacing information, the duration information of the data transmission, the pilot sequence information or the scrambling sequence information.

In at least one embodiment, the transmission pattern corresponding to each of the multiple data packets may be predetermined by the transmitter and the receiver, or the transmission pattern corresponding to each of the multiple data packets may be transmitted to the receiver by the transmitter through the signaling.

In at least one embodiment, the feedback information may carry indication information configured to indicate whether the receiver correctly receives the specified data packet in the multiple data packets transmitted by the transmitter. The specified data packet may be the data packet having the preset timing relationship with the feedback information.

In at least one embodiment, the preset timing relationship may be a timing relationship predetermined by the transmitter and the receiver, or the preset timing relationship may be transmitted to the receiver by the transmitter through the signaling.

In at least one embodiment, the feedback information may carry any one of the following indication information: the indication information for indicating whether the receiver correctly receives the first data packet in the multiple data packets, the first data packet being any data packet in the multiple data packets; the indication information for indicating whether the receiver correctly receives at least two of the multiple data packets; or the indication information for indicating whether the receiver correctly receives the information in the multiple data packets.

In at least one embodiment, the processor may further be specifically configured to, responsive to determining that the feedback information carries the ACK information, stop transmitting the data packet carrying the same information as that of the multiple data packets and, responsive to determining that the feedback information carries the NACK information, transmit the data packet carrying the same information as that of the multiple data packets.

In at least one embodiment, the processor may further be specifically configured to, when the number of the multiple data packets transmitted by the transmitter is more than or equal to the preset threshold, stop transmitting the data packet carrying the same information as that of the multiple data packets.

In at least one embodiment, the communication interface may configured to transmit a the scheduling signaling to the receiver, wherein the scheduling signaling may be configured to indicate the receiver to receive the multiple data packets, or transmit the multiple scheduling signalings to the receiver, wherein the multiple scheduling signalings may be in one-to-one correspondence with the multiple data packets and each scheduling signaling may be configured to indicate the receiver to receive the data packet corresponding to the scheduling signaling.

Figure 10:
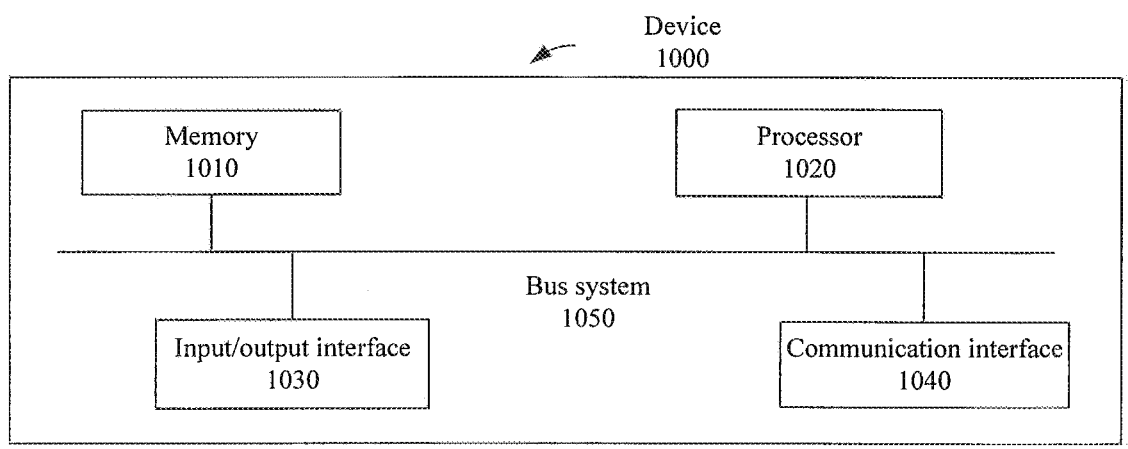
FIG. 10 is a schematic block diagram of a device for data transmission according to another embodiment of the disclosure.

FIG. 10 is a schematic block diagram of a device for data transmission according to another embodiment of the disclosure. The device 1000 illustrated in FIG. 10 includes a memory 1010, a processor 1020, an input/output interface 1030, a communication interface 1040 and a bus system 1050. The memory 1010, the processor 1020, the input/output interface 1030 and the communication interface 1040 are connected through the bus system 1050. The memory 1010 may be configured to store an instruction. The processor 1020 may be configured to execute the instruction stored in the memory 1010 to control the input/output interface 1030 to receive input data and information and output data such as an operation result and control the communication interface 1040 to transmit a signal.

The communication interface 1040 may be configured to receive multiple data packets continuously transmitted by a transmitter and carrying the same information.

The processor 1020 may be configured to detect at least part of the multiple data packets to determine a detection result of the at least part of data packets and determine feedback information for the at least part of data packets according to the detection result of the at least part of data packets.

The communication interface 1040 may further be configured to transmit the feedback information to the transmitter. The feedback information may be configured to indicate whether a receiver correctly receives the at least part of the multiple data packets.

It should be understood that in the embodiment of the disclosure, the processor 1020 may adopt a universal CPU, a microprocessor, an ASIC or one or more integrated circuits, and may be configured to execute a related program to implement the technical solution provided in the embodiment of the disclosure.

It is also to be understood that the communication interface 1040 uses, for example, but not limited to, a transceiver device such as a transceiver to implement communication between the mobile terminal 1000 and another device or a communication network.

The memory 1010 may include a ROM and a RAM and provides an instruction and data for the processor 1020. A part of the processor 1020 may further include a nonvolatile RAM. For example, the processor 1020 may further store information of a device type.

The bus system 1050 may include a data bus, and may further include a power bus, a control bus, a state signal bus and the like. However, for clear description, various buses in the figure are marked as the bus system 1050.

In an implementation process, each operation of the method may be completed by an integrated logic circuit of hardware in the processor 1020 or an instruction in a software form. The method for data transmission disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 1010, and the processor 1020 reads information in the memory 1010, and completes the operations of the method in combination with hardware. No more detailed descriptions will be made herein to avoid repetitions.

In at least one embodiment, the communication interface may be specifically configured to receive the multiple data packets continuously transmitted by the transmitter and carrying the same information based on a transmission pattern respectively corresponding to each of the multiple data packets.

In at least one embodiment, the communication interface may further be specifically configured to receive the multiple data packets transmitted by the transmitter and carrying the same information based on at least two transmission patterns.

In at least one embodiment, the communication interface may be specifically configured to transmit the feedback information to the transmitter, wherein the feedback information may carry information configured to indicate at least one of a transmission pattern corresponding to a target data packet in the multiple data packets or a transmission sequence number of the target data packet.

In at least one embodiment, the target data packet may include any one of the following data packets: a data packet which is not correctly received by the receiver; a data packet which is correctly received by the receiver; a data packet which is transmitted on a channel with best channel quality in at least one channel used for transmission of the multiple data packets; a data packet which is transmitted on a channel with worst channel quality in the at least one channel used for transmission of the multiple data packets; a data packet with a worst detection error rate in the multiple data packets; or a data packet with a best detection error rate in the multiple data packets.

In at least one embodiment, the transmission pattern may be formed by at least one of the following transmission information: HARQ redundancy version information, frequency-domain resource information, time-domain resource information, beamforming vector information, subcarrier spacing information, duration information of the data transmission, pilot sequence information or scrambling sequence information.

In at least one embodiment, the transmission pattern corresponding to each data packet in the multiple data packets may be predetermined by the transmitter and the receiver, or the transmission pattern corresponding to each data packet in the multiple data packets may be indicated to the receiver by the transmitter through signaling.

In at least one embodiment, the communication interface may further be specifically configured to transmit the feedback information to the transmitter. The feedback information may carry indication information configured to indicate whether the receiver correctly receives a specified data packet in the multiple data packets transmitted by the transmitter and the specified data packet may be a data packet having a preset timing relationship with the feedback information.

In at least one embodiment, the preset timing relationship may be a timing relationship predetermined by the transmitter and the receiver, or the preset timing relationship may be transmitted to the receiver by the transmitter through the signaling.

In at least one embodiment, the feedback information may carry any one of the following indication information: the indication information for indicating whether the receiver correctly receives the first data packet in the multiple data packets, the first data packet being any data packet in the multiple data packets; the indication information for indicating whether the receiver correctly receives the at least two data packets in the multiple data packets; or the indication information for indicating whether the receiver correctly receives the information in the multiple data packets.

In at least one embodiment, the communication interface may further be configured to receive a scheduling signaling transmitted by the transmitter, wherein the scheduling signaling may be configured to indicate the receiver to receive the multiple data packets, or receive multiple scheduling signalings, wherein the multiple scheduling signalings may be in one-to-one correspondence with the multiple data packets and each scheduling signaling may be configured to indicate the receiver to receive the data packet corresponding to the scheduling signaling.

In at least one embodiment, the processor may further be specifically configured to detect each data packet in the multiple data packets or perform joint detection on at least two of the multiple data packets.

It should be understood that in the embodiments of the disclosure, "B corresponding to A" represents that B is associated with A and B may be determined according to A. It is also to be understood that determining B according to A does not mean that B is determined only according to A and B may also be determined according to A and/or other information.

It should be understood that term "and/or" in the disclosure is only an association relationship for describing associated objects and represents that three relationships may exist. For example, A and/or B may represent three conditions: i.e., independent existence of A, existence of both A and B and independent existence of B. In addition, the character "/" in the disclosure usually represents that previous and next associated objects form an "or" relationship.

It should be understood that in various embodiments of the disclosure, a sequence number of each process doe's not mean an execution sequence and the execution sequence of each process should be determined by its function and an internal logic and should not form any limit to an implementation process of the embodiments of the disclosure.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it should be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of time disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for data transmission, comprising:
   continuously transmitting, by a transceiver, multiple data packets carrying same information to a receiver based on different transmission patterns; and
   stopping, by the transceiver, transmitting of the multiple data packets carrying the same information when feedback information from the receiver indicates that at least part of the multiple data packets is received correctly in case where a number of data packets transmitted is less than a preset threshold value;
   wherein the transmission pattern corresponding to each of the multiple data packets is predetermined by a transmitter and the receiver.

2. The method of claim 1, wherein each of the multiple data packets corresponds to a transmission pattern.

3. The method of claim 2, wherein the transmission patterns corresponding to the multiple data packets are different from each other.

4. The method of claim 2, wherein the transmission pattern is formed by at least one of the following transmission information:
   Hybrid Automatic Repeat reQuest (HARQ) redundancy version information, frequency-domain resource information, time-domain resource information, beamforming vector information, subcarrier spacing information, duration information of the data transmission, pilot sequence information or scrambling sequence information.

5. The method of claim 2, wherein the transmission pattern corresponding to each of the multiple data packets is indicated to the receiver by the transmitter through signaling.

6. A device for data transmission, comprising: a processor, a transceiver, and a memory for storing instructions executed by the processor,
   wherein the transceiver is configured to:
   continuously transmit multiple data packets carrying same information to a receiver based on different transmission patterns; and
   stop transmitting of the multiple data packets carrying the same information when feedback information from the receiver indicates that at least part of the multiple data packets is received correctly in case where a number of data packets transmitted is less than a preset threshold value;
   wherein the transmission pattern corresponding to each of the multiple data packets is predetermined by a transmitter and the receiver.

7. The device of claim 6, wherein each of the multiple data packets corresponds to a transmission pattern.

8. The device of claim 7, wherein the transmission pattern is formed by at least one of the following transmission information:
   Hybrid Automatic Repeat reQuest (HARQ) redundancy version information, frequency-domain resource information, time-domain resource information, beamforming vector information, subcarrier spacing information, duration information of the data transmission, pilot sequence information or scrambling sequence information.

9. The device of claim 7, wherein the transmission pattern corresponding to each of the multiple data packets is predetermined by a transmitter and the receiver.

10. The device of claim 8, wherein the transmission pattern corresponding to each of the multiple data packets is indicated to the receiver by the transmitter through signaling.

11. A device for data transmission, comprising: a processor, a transceiver and a memory for storing instructions executed by the processor,
    wherein the transceiver is configured to:
    continuously receive multiple data packets carrying same information from a transmitter based on different transmission patterns until at least part of the multiple data packets is received correctly in case where a number of data packets received is less than a preset threshold value, and transmit feedback information indicating that the at least part of the multiple data packets is received correctly;
    wherein the transmission pattern corresponding to each of the multiple data packets is predetermined by a transmitter and the receiver.

12. The device of claim 11, wherein each of the multiple data packets corresponds to a transmission pattern.

13. The device of claim 12, wherein the transmission pattern is formed by at least one of the following transmission information:
    Hybrid Automatic Repeat reQuest (HARQ) redundancy version information, frequency-domain resource information, time-domain resource information, beamforming vector information, subcarrier spacing information, duration information of the data transmission, pilot sequence information or scrambling sequence information.

14. The device of claim 12, wherein the transmission pattern corresponding to each of the multiple data packets is predetermined by the transmitter and a receiver.

15. The device of claim 12, wherein the transmission pattern corresponding to each of the multiple data packets is indicated to the receiver by the transmitter through signaling.

* * * * *